(12) United States Patent
Mohseni et al.

(10) Patent No.: US 9,369,962 B2
(45) Date of Patent: Jun. 14, 2016

(54) REDUCING IDLE MODE POWER CONSUMPTION FOR MONITORING NEIGHBORING BASE STATIONS

(75) Inventors: Jafar Mohseni, San Diego, CA (US); Philip J. Children, Reading (GB); Nigel Phillip Robinson, Ashington (GB); Nicholas J. Tebbit, Old Windsor (GB); Christopher J. Smith, Franham (GB); Helena Deirdre O'Shea, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 70 days.

(21) Appl. No.: 13/108,864

(22) Filed: May 16, 2011

(65) Prior Publication Data

US 2011/0280144 A1 Nov. 17, 2011

Related U.S. Application Data

(60) Provisional application No. 61/345,555, filed on May 17, 2010.

(51) Int. Cl.
*H04J 1/16* (2006.01)
*H04W 52/02* (2009.01)
(Continued)

(52) U.S. Cl.
CPC ........... *H04W 52/0245* (2013.01); *H04L 43/02* (2013.01); *H04L 43/022* (2013.01);
(Continued)

(58) Field of Classification Search
CPC ..... H04L 43/02; H04L 43/022; H04L 43/024; H04L 43/0811; H04L 43/16; H04W 24/02; H04W 24/04; H04W 48/04; H04W 48/06; H04W 48/10; H04W 48/12; H04W 48/20; H04W 52/0209; H04W 52/0225; H04W 52/0232; H04W 52/0245; H04W 52/0251; H04W 52/0254; H04W 52/0258
USPC .................................. 370/252, 254, 311, 332
See application file for complete search history.

(56) References Cited

U.S. PATENT DOCUMENTS 5,363,411 A 11/1994 Furuya et al.
5,539,748 A * 7/1996 Raith ............................ 370/329
(Continued)

FOREIGN PATENT DOCUMENTS

CN 1247674 A 3/2000
CN 1599449 A 3/2005
(Continued)

OTHER PUBLICATIONS

International Search Report and Written Opinion—PCT/US2011/036749, International Search Authority—European Patent Office—Aug. 26, 2011.
(Continued)

*Primary Examiner* — Peter Cheng
(74) *Attorney, Agent, or Firm* — Michael J. DeHaemer, Jr.

(57) ABSTRACT

A method for reducing idle mode power consumption is disclosed. An idle mode is entered. A neighboring base station is selected. If the selected neighboring base station is assigned a high-frequency monitoring mode, a signal strength of the neighboring base station is measured. A low-frequency monitoring mode is assigned to the selected neighboring base station if the signal strength of the selected neighboring base station has been below a power threshold for longer than a time threshold. Other aspects, embodiments, and features are also claimed and described.

23 Claims, 10 Drawing Sheets

(51) Int. Cl.
  *H04L 12/26* (2006.01)
  *H04W 24/02* (2009.01)
  *H04W 24/04* (2009.01)
  *H04W 48/16* (2009.01)

(52) U.S. Cl.
  CPC .......... *H04L 43/024* (2013.01); *H04L 43/0811* (2013.01); *H04L 43/16* (2013.01); *H04W 24/02* (2013.01); *H04W 24/04* (2013.01); *H04W 48/16* (2013.01); *Y02B 60/50* (2013.01)

(56) References Cited

U.S. PATENT DOCUMENTS

| | | | |
|---|---|---|---|
| 2003/0040312 A1 | 2/2003 | Tohono | |
| 2005/0272425 A1* | 12/2005 | Amerga et al. | 455/436 |
| 2009/0029652 A1 | 1/2009 | Xie et al. | |
| 2009/0047958 A1* | 2/2009 | Rimhagen et al. | 455/436 |
| 2009/0156192 A1* | 6/2009 | Ryu | H04W 68/00 455/419 |
| 2010/0120406 A1* | 5/2010 | Banga et al. | 455/418 |
| 2010/0304794 A1 | 12/2010 | Beninghaus et al. | |
| 2010/0315346 A1* | 12/2010 | Lindroos et al. | 345/173 |
| 2010/0321114 A1 | 12/2010 | Okada et al. | |
| 2011/0201279 A1 | 8/2011 | Suzuki et al. | |
| 2012/0052858 A1 | 3/2012 | Mohseni et al. | |

FOREIGN PATENT DOCUMENTS

| | | | | |
|---|---|---|---|---|
| CN | 1607852 | A | | 4/2005 |
| CN | 101014171 | A | | 8/2007 |
| EP | 1161107 | A1 | * | 12/2001 |
| EP | 1161107 | A1 | | 12/2001 |
| EP | 1841080 | A1 | | 10/2007 |
| GB | 2328582 | A | * | 2/1999 |
| GB | 2328582 | A | | 2/1999 |
| GB | 2358550 | A | | 7/2001 |
| GB | 2358767 | A | | 8/2001 |
| JP | H057169 | A | | 1/1993 |
| JP | 2000354266 | A | | 12/2000 |
| JP | 2003061158 | A | | 2/2003 |
| JP | 2005007169 | A | | 1/2005 |
| JP | 3866106 | B2 | | 1/2007 |
| JP | 2007081979 | A | | 3/2007 |
| JP | 2008042383 | A | | 2/2008 |
| JP | 2008160303 | A | | 7/2008 |
| WO | WO 9962285 | A1 | | 12/1999 |
| WO | WO 2004042941 | | | 5/2004 |
| WO | 2004105255 | A2 | | 12/2004 |
| WO | 2010052669 | A1 | | 5/2010 |
| WO | WO-2010053384 | A1 | | 5/2010 |

OTHER PUBLICATIONS

PCT Application PCT/US2011/036749, filed May 17, 2011, published as WO/2011/146435.
Response to Written Opinion Under Article 34 PCT Application PCT/US2011/036749, dated Jul. 2, 2012.
Chapter II Demand & Response to Written Opinion Under Article 34 for PCT/US2011/049436 filed May 2, 2012.
Notification of Transmittal of the International Preliminary Report on Patentability PCT Application PCT/US2011/036749, issued by the EPO, dated Aug. 14, 2012.
Second Written Opinion (PCT 408) for PCT Application PCT/US2011/036749 issued by the EPO, dated May 7, 2012.
Taiwan Search Report—TW100117262—TIPO—Nov. 18, 2013.
TSG-RAN Working Group 4 (Radio) Meeting #48, Nortel Networks, "Radio Link Problem Detection by the UE," R4-081726, Aug. 22, 2008, pp. 1-5.

* cited by examiner

REDUCING IDLE MODE POWER CONSUMPTION FOR MONITORING NEIGHBORING BASE STATIONS

RELATED APPLICATION & PRIORITY CLAIM

This application is related to and claims priority to U.S. Provisional Patent Application Ser. No. 61/345,555 filed May 17, 2010, for "Reducing Idle Mode Power Consumption."

TECHNICAL FIELD

Embodiments of the present invention relate generally to communication systems, and more specifically to reducing idle mode power consumption for monitoring neighboring base stations or for other monitoring purposes.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple wireless communication devices with one or more base stations.

Mobile devices may have multiple modes of operation. For example, a mobile device may be actively transmitting voice or data over a wireless link. Alternatively, a mobile device may be in an idle mode, where it has limited functionality. Like other portable electronics, mobile devices may have limited battery life. Therefore, benefits may be realized by reducing idle mode power consumption for monitoring neighboring base stations.

SUMMARY

Embodiments of the present invention generally include devices, methods, and systems configured to reduce idle mode power consumption levels. Typically wireless devices enter an idle mode when not actively communicating. Yet during idle mode, wireless device may be monitoring wireless signals. This monitoring may cause excessive or unwanted power use, and embodiments of the present invention enable reduction of idle mode power usage. Generally, a wireless device embodiment of the invention can reduce power consumption based on a neighboring wireless device's signal strength. If the neighboring wireless device's signal strength is above or below a threshold, the wireless device embodiment can modify (e.g., increase or decrease) the frequency it uses to monitor the neighboring wireless device's signal strength. The wireless device can also assign frequency status identifiers or states to the neighboring wireless device to track its signal strength. The wireless device can also be configured to monitor multiple neighbors. Additional exemplary embodiments of the present invention are summarized below.

A method for reducing idle mode power consumption is disclosed. An idle mode is entered. A neighboring base station is selected. If the selected neighboring base station is assigned a high-frequency monitoring mode, a signal strength of the neighboring base station is measured. A low-frequency monitoring mode is assigned to the selected neighboring base station if the signal strength of the selected neighboring base station has been below a power threshold for longer than a time threshold.

If, however, the selected neighboring base station is assigned the low-frequency monitoring mode, the signal strength of the neighboring base station may be measured if it is time to monitor the signal strength. The high-frequency monitoring mode may be assigned to the selected neighboring base station if the signal strength of the selected neighboring base station is above the power threshold.

A minimum number of power monitors may be performed per paging cycle only if all neighboring base stations are in low-frequency monitoring mode. In contrast, more than the minimum number of power monitors may be performed per paging cycle if at least one neighboring base station is assigned the high-frequency monitoring mode.

An idle mode timer may be maintained for each neighboring base station. The assigning of the low-frequency monitoring mode may include comparing the idle mode timer for the selected base station with the time threshold. The assigning of the high-frequency monitoring mode may include resetting the idle mode timer for the selected neighboring base station if the selected neighboring base station is above the power threshold. The power threshold and time threshold may be selected to achieve a power reduction in idle mode and maintain performance indicators during operation. The method may be performed in a Global System for Mobile Communications (GSM) system.

A wireless communication device for reducing idle mode consumption is also disclosed. The wireless communication device includes a processor and memory in electronic communication with the processor. Executable instructions are stored in the memory. The instructions are executable to enter an idle mode. The instructions are also executable to select a neighboring base station. The instructions are also executable to, if the selected neighboring base station is assigned a high-frequency monitoring mode, measure a signal strength of the neighboring base station. The instructions are also executable to, if the selected neighboring base station is assigned a high-frequency monitoring mode, assign a low-frequency monitoring mode to the selected neighboring base station if the signal strength of the selected neighboring base station has been below a power threshold for longer than a time threshold.

A wireless communication device for reducing idle mode consumption is also disclosed. The wireless communication device includes means for entering an idle mode. The wireless communication device also includes means for selecting a neighboring base station. The wireless communication device also includes means for measuring, if the selected neighboring base station is assigned a high-frequency monitoring mode, a signal strength of the neighboring base station. The wireless communication device also includes means for assigning, if the selected neighboring base station is assigned a high-frequency monitoring mode, a low-frequency monitoring mode to the selected neighboring base station if the signal strength of the selected neighboring base station has been below a power threshold for longer than a time threshold.

A computer-program product for reducing idle mode power consumption is also disclosed. The computer-program product comprises a non-transitory computer-readable medium having instructions thereon. The instructions include code for causing a wireless communication device to enter an idle mode. The instructions also include code for causing the wireless communication device to select a neighboring base station. The instructions also include code for causing the wireless communication device to measure, if the selected neighboring base station is assigned a high-frequency monitoring mode, a signal strength of the neighboring base station. The instructions also include code for causing the wireless communication device to assign, if the selected neighboring base station is assigned a high-frequency monitoring mode, a low-frequency monitoring mode to the selected neighboring base station if the signal strength of the selected neighboring base station has been below a power threshold for longer than a time threshold.

Other aspects and features of embodiments of the present invention will become apparent to those of ordinary skill in the art, upon reviewing the following description of specific, exemplary embodiments of the present invention in concert with the various figures. While features of the present invention may be discussed relative to certain embodiments and figures, all embodiments of the present invention can include one or more of the discussed features. While one or more embodiments may be discussed as having certain advantageous features, one or more of such features may also be used with the other discussed various embodiments. In similar fashion, while exemplary embodiments may be discussed below as system or method embodiments it is to be understood that such exemplary embodiments can be implemented in various devices, systems, and methods. Thus discussion of one feature with one embodiment does not limit other embodiments from possessing and including that same feature.

DETAILED DESCRIPTION OF EXEMPLARY EMBODIMENTS

More and more people are using mobile communication devices, such as, for example, mobile phones, not only for voice, but also for data communications. In the Global System for Mobile Communications (GSM)/Enhanced Data rates for GSM Evolution (EDGE) Radio Access Network (GERAN) specification, General Packet Radio Service (GPRS) and Enhanced GPRS (EGPRS) provide data services. The standards for GERAN are maintained by the 3GPP (Third Generation Partnership Project). GERAN is a part of GSM. More specifically, GERAN is the radio part of GSM/EDGE together with the network that joins the base stations (the Ater and Abis interfaces) and the base station controllers (A interfaces, etc.). GERAN represents the core of a GSM network. It routes phone calls and packet data from and to the public switched telephone network (PSTN) and Internet to and from remote terminals. GERAN is also a part of combined UMTS/GSM networks.

When in idle mode, wireless communication devices using $2^{nd}$ generation (2G) wireless telephone technology (e.g., GSM) may regularly monitor the power of the neighboring cells, i.e., signal strength of transmitting neighboring base stations. This is typically done when the wireless communication device "wakes up" to decode the paging channel. Power monitoring may draw extra power from the battery because it involves extra operation time for radio frequency (RF) components and baseband processing components. Power monitoring may also lead to elongating the "awake time" when the amount of monitoring per paging channel (PCH) block is high. The idle mode current consumption that affects the standby time of the wireless communication device is a key measure in design and manufacturing.

Figure 1:
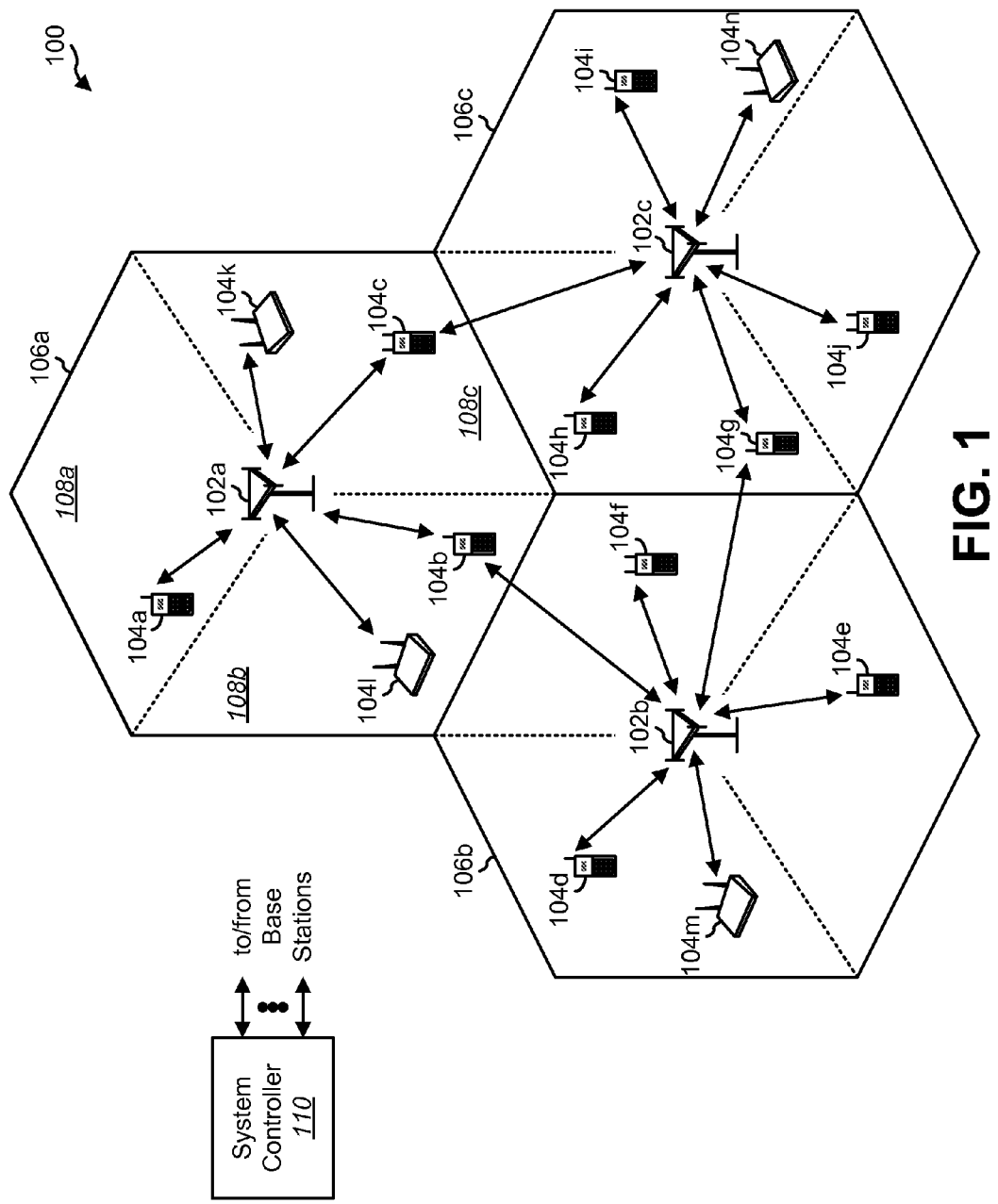
FIG. 1 illustrates a wireless communication system in which the methods and apparatus disclosed herein may be utilized.

FIG. 1 illustrates a wireless communication system 100 in which the methods and apparatus disclosed herein may be utilized. The wireless communication system 100 includes multiple base stations (BS) 102a-c and multiple wireless communication devices 104a-n. Each base station 102a-c provides communication coverage for a particular geographic area 106a-c. The term "cell" can refer to a base station 102a-c and/or its coverage area 106a-c, depending on the context in which the term is used.

Wireless communication components discussed herein can be referred to using the following terminology. For example, the term "wireless communication device" 104a-n refers to an electronic device that may be used for voice and/or data communication over a wireless communication system 100. Examples of wireless communication devices 104a-n include cellular phones, personal digital assistants (PDAs), handheld devices, wireless modems, laptop computers, personal computers, etc. A wireless communication device 104a-n may alternatively be referred to as an access terminal, a mobile terminal, a mobile station, a remote station, a user terminal, a terminal, a subscriber unit, a subscriber station, a mobile device, a wireless device, user equipment (UE) or some other similar terminology. The term "base station" 102a-c refers to a wireless communication station that is installed at a fixed location and used to communicate with wireless communication devices 104a-n. A base station 102a-c may alternatively be referred to as an access point, a Node B, an evolved Node B or some other similar terminology.

To improve system capacity, a base station 102a-c coverage area 106a-c may be partitioned into multiple smaller areas, e.g., three smaller areas 108a, 108b and 108c. Each smaller area 108a, 108b, 108c may be served by a respective base transceiver station (BTS). The term "sector" can refer to a BTS and/or its coverage area 108a-c depending on the context in which the term is used. For a sectorized cell, the BTSs for all sectors of that cell are typically co-located within the base station 102 for the cell.

Wireless communication devices 104a-n are typically dispersed throughout the system 100. A wireless communication device 104a-n may communicate with zero, one, or multiple base stations 102a-c on the downlink and/or uplink at any given moment.

For a centralized architecture, a system controller 110 may couple to the base stations 102a-c and provide coordination and control for the base stations 102a-c. The system controller 110 may be a single network entity or a collection of network entities. For a distributed architecture, base stations 102a-c may communicate with one another as needed.

Figure 2:
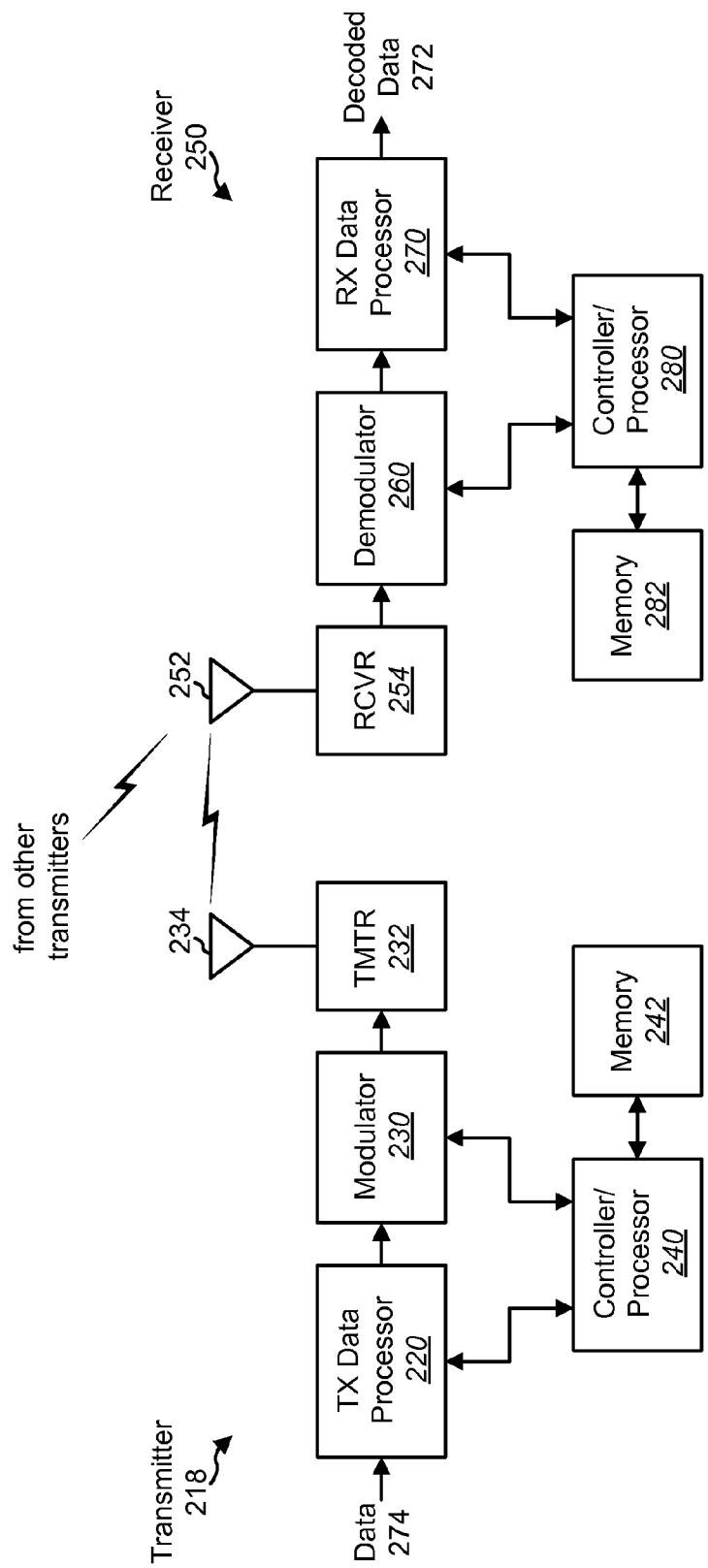
FIG. 2 is a block diagram illustrating a transmitter and a receiver in a wireless communication system.

FIG. 2 is a block diagram illustrating a transmitter 218 and a receiver 250 in a wireless communication system. For the downlink, the transmitter 218 may be part of a base station 102a-c, and receiver 250 may be part of a wireless communication device 104a-n. For the uplink, the transmitter 218 may be part of a wireless communication device 104a-n, and receiver 250 may be part of a base station 102a-c.

In the transmitter 218, a transmit (TX) data processor 220 receives and processes (e.g., formats, encodes, and interleaves) data 274 and provides coded data. A modulator 230 performs modulation on the coded data and provides a modulated signal. Modulator 230 may perform Gaussian minimum shift keying (GMSK) for GSM, 8-ary phase shift keying (8-PSK) for Enhanced Data rates for Global Evolution (EDGE), etc. GMSK is a continuous phase modulation protocol, whereas 8-PSK is a digital modulation protocol. A transmitter unit (TMTR) 232 conditions (e.g., filters, amplifies, and upconverts) the modulated signal and generates an RF-modulated signal, which is transmitted via an antenna 234.

At receiver 250, an antenna 252 receives RF-modulated signals from transmitter 218 and other transmitters. The antenna 252 may provide a received RF signal to a receiver unit (RCVR) 254. The receiver unit 254 conditions (e.g., filters, amplifies, and downconverts) the received RF signal, digitizes the conditioned signal, and provides samples. A demodulator 260 processes the samples as described below and provides demodulated data. A receive (RX) data processor 270 processes (e.g., deinterleaves and decodes) the demodulated data and provides decoded data 272. In general, the processing by demodulator 260 and RX data processor 270 is complementary to the processing by modulator 230 and TX data processor 220, respectively, at transmitter 218.

Controllers/processors 240 and 280 direct operation at transmitter 218 and receiver 250, respectively. Memory 242 and 282 may store program codes in the form of computer software and data used by transmitter 218 and receiver 250, respectively.

Figure 3:
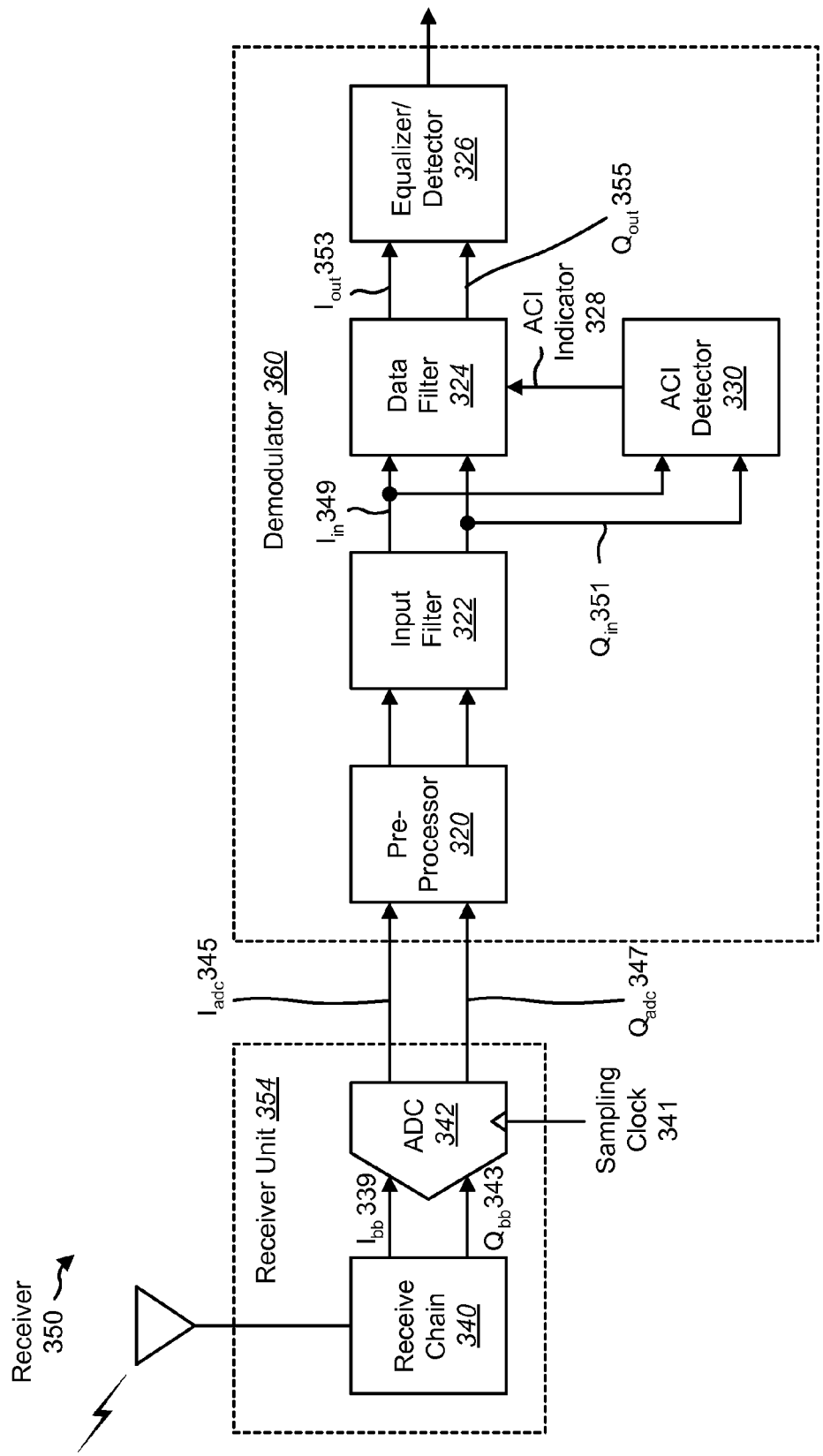
FIG. 3 is a block diagram illustrating a design of a receiver unit and a demodulator at a receiver.

FIG. 3 is a block diagram illustrating a design of a receiver unit 354 and a demodulator 360 at a receiver 350. Within the receiver unit 354, a receive chain 340 processes the received RF signal and provides I baseband signals ($I_{bb}$) 339 and Q baseband signals ($Q_{bb}$) 343. Receive chain 340 may perform low noise amplification, analog filtering, quadrature downconversion, etc. An analog-to-digital converter (ADC) 342 digitizes $I_{bb}$ 339 and $Q_{bb}$ 343 at a sampling rate of $f_{adc}$ using a sampling clock 341 and provides input samples, which are denoted as $I_{adc}$ 345 and $Q_{adc}$ 347. In general, the ADC sampling rate $f_{adc}$ may be related to the symbol rate $f_{sym}$ by any integer or non-integer factor.

Within demodulator 360, a pre-processor 320 performs pre-processing on the $I_{adc}$ 345 and $Q_{adc}$ 347 from ADC 342. For example, a pre-processor 320 may remove direct current (DC) offset, remove frequency offset, etc. An input filter 322 may filter the samples from pre-processor 320 based on a particular frequency response and provides input I and Q samples, which are denoted as $I_{in}$ 349 and $Q_{in}$ 351. The input filter 322 may filter $I_{in}$ 349 and $Q_{in}$ 351 to suppress images resulting from the sampling by the ADC 342 as well as jammers. The input filter 322 may also perform sample rate conversion, e.g., from 24× oversampling down to 2× oversampling. A data filter 324 may filter $I_{in}$ 349 and $Q_{in}$ 351 from input filter 322 based on another frequency response and provides output I and Q samples, which are denoted as $I_{out}$ 353 and $Q_{out}$ 355. Filters 322 and 324 may be implemented with finite impulse response (FIR) filters, infinite impulse response (IIR) filters or filters of other types. The frequency responses of filters 322 and 324 may be selected to achieve good performance. In one design, the frequency response of filter 322 is fixed, and the frequency response of filter 324 is configurable.

An adjacent channel interference (ACI) detector 330 can receive input I and Q samples from the input filter 322, detects ACI in the received RF signal and provides an ACI indicator 328 to filter 324. The ACI indicator 328 may indicate whether or not ACI is present and, if present, whether the ACI is due to the higher RF channel centered at +200 KHz and/or the lower RF channel centered at −200 KHz. The frequency response of filter 324 may be adjusted based on the ACI indicator 328, as described below, to achieve good performance.

An equalizer/detector 326 receives $I_{out}$ 353 and $Q_{out}$ 355 from filter 324 and performs equalization, matched filtering, detection and/or other processing on these samples. For example, equalizer/detector 326 may implement a maximum likelihood sequence estimator (MLSE) that determines a sequence of symbols that is most likely to have been transmitted given a sequence of $I_{out}$ 353 and $Q_{out}$ 355 and a channel estimate.

The Global System for Mobile Communications (GSM) is a widespread standard in cellular, wireless communication. GSM employs a combination of Time Division Multiple Access (TDMA) and Frequency Division Multiple Access (FDMA) for the purpose of sharing the spectrum resource. GSM networks typically operate in a number of frequency bands. For example, for uplink communication, GSM-900 commonly uses a radio spectrum in the 890-915 MHz bands (mobile station to base transceiver station). For downlink communication, GSM 900 uses 935-960 MHz bands (base station to mobile station). Furthermore, each frequency band is divided into 200 kHz carrier frequencies providing 124 RF channels spaced at 200 kHz. GSM-1900 uses the 1850-1910 MHz bands for the uplink and 1930-1990 MHz bands for the downlink. Like GSM 900, FDMA divides the spectrum for both uplink and downlink into 200 kHz-wide carrier frequencies. Similarly, GSM-850 uses the 824-849 MHz bands for the uplink and 869-894 MHz bands for the downlink, while GSM-1800 uses the 1710-1785 MHz bands for the uplink and 1805-1880 MHz bands for the downlink.

An example of an existing GSM system is identified in technical specification document 3GPP TS 45.002 V4.8.0 (2003-06) titled "Technical Specification 3rd Generation Partnership Project; Technical Specification Group GSM/EDGE Radio Access Network; Multiplexing and multiple access on the radio path (Release 4)," published by the 3rd Generation Partnership Project (3GPP) standards-setting organization.

Each channel in GSM is identified by a specific absolute radio frequency channel (ARFCN). For example, ARFCN 1-124 are assigned to the channels of GSM 900, while ARFCN 512-810 are assigned to the channels of GSM 1900. Similarly, ARFCN 128-251 are assigned to the channels of GSM 850, while ARFCN 512-885 are assigned to the channels of GSM 1800. Also, each base station 102 is assigned one or more carrier frequencies. Each carrier frequency is divided into eight time slots (which are labeled as time slots 0 through 7) using TDMA, such that eight consecutive time slots form one TDMA frame with a duration of 4.615 ms. A physical channel occupies one time slot within a TDMA frame. Each active wireless device/user is assigned one or more time slot indices for the duration of a call. User-specific data for each wireless device is sent in the time slot(s) assigned to that wireless device and in TDMA frames used for the traffic channels.

Each time slot within a frame is also referred to as a "burst" in GSM. Each burst includes two tail fields, two data fields, a training sequence (or midamble) field and a guard period (GP). The number of symbols in each field is shown inside the parentheses. A burst includes 148 symbols for the tail, data and midamble fields. No symbols are sent in the guard period. TDMA frames of a particular carrier frequency are numbered and formed in groups of 26 or 51 TDMA frames called multiframes.

Figure 4:
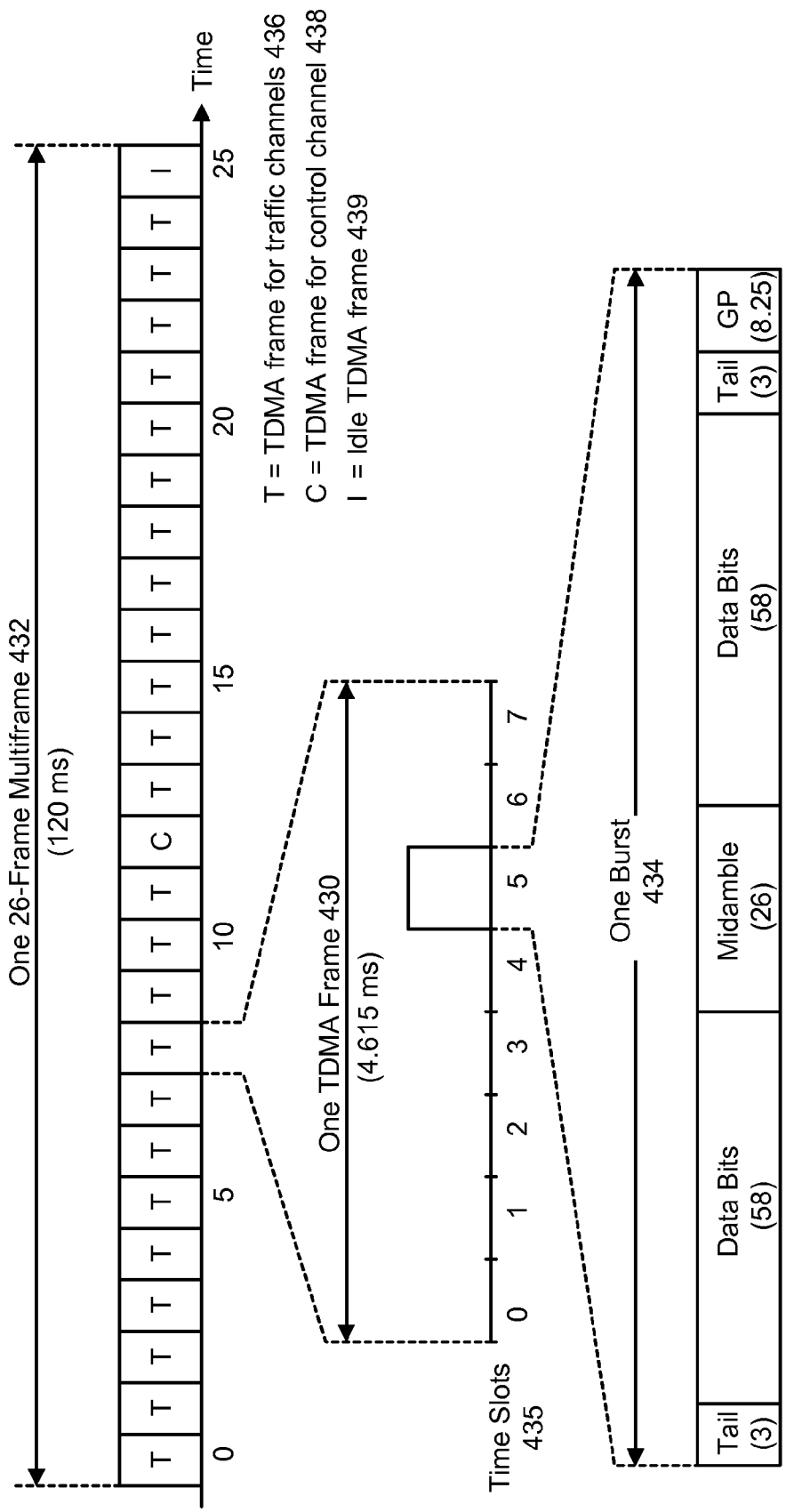
FIG. 4 is a block diagram illustrating Time Division Multiple Access (TDMA) frame and burst formats in Global System for Mobile Communications (GSM)

FIG. 4 is a block diagram illustrating Time Division Multiple Access (TDMA) frame 430 and burst 434 in Global System for Mobile Communications (GSM). The timeline for GSM transmission may be divided into multiframes 432. In one configuration, each multiframe 432 may include 26 TDMA frames 430, which are labeled as TDMA frames 0 through 25. Of the 26 TDMA frames 430, 24 may be TDMA frames for traffic channels 436 (i.e., TDMA frames 0 through 11 and 13 through 24 of each multiframe). Additionally, one TDMA frame 438 may be for control channels (i.e., TDMA frame 12). TDMA frame 25 may be an idle TDMA frame 439, which is used by the wireless devices to make measurements for neighbor base stations 102. Each TDMA frame 430 may include 8 TDMA bursts 434. Each TDMA burst 434 may fill one of eight time slots 435 in a TDMA frame 430 and may include tail bits, data bits, midamble bits and guard period (GP) bits.

Figure 5:
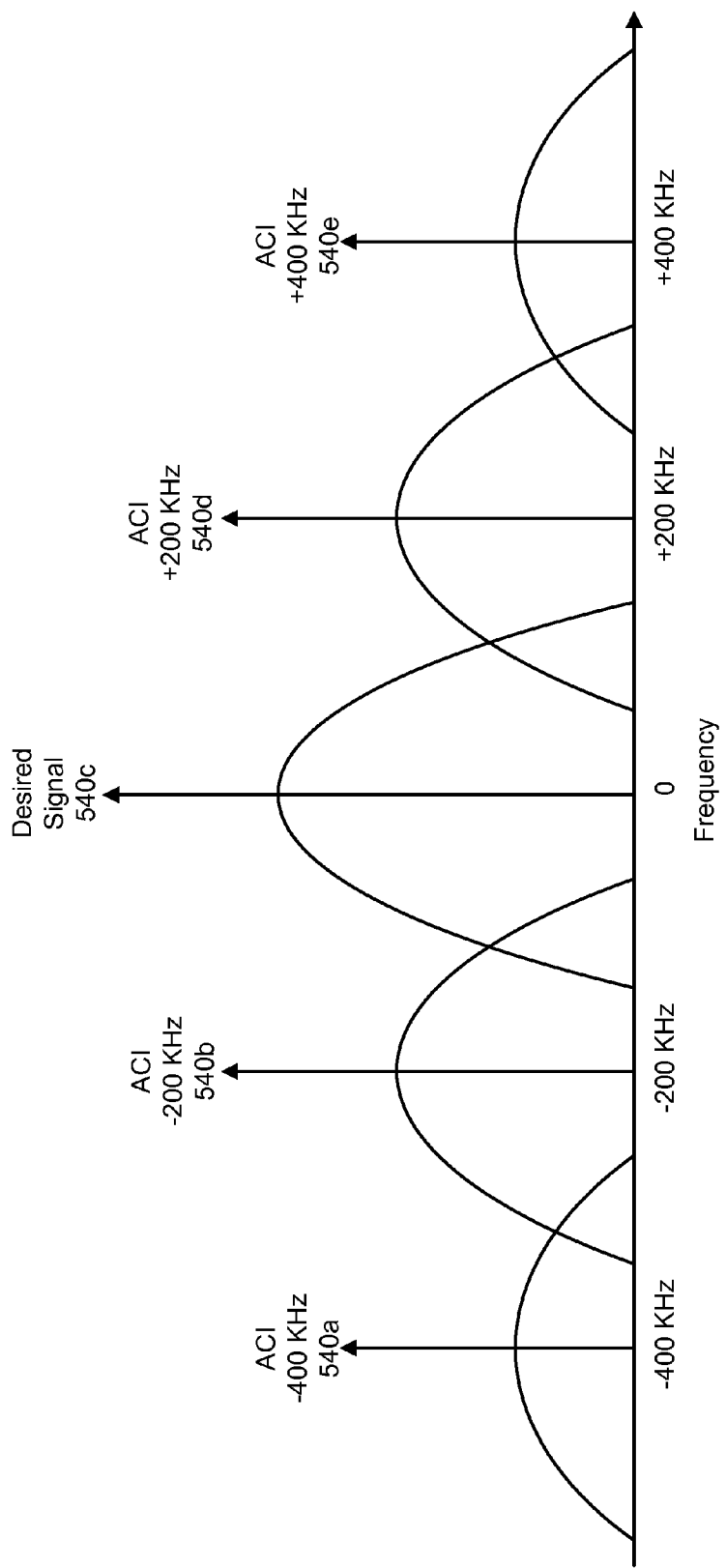
FIG. 5 illustrates an example spectrum in a GSM system.

FIG. 5 illustrates an example spectrum in a GSM system. In this example, five RF modulated signals are transmitted on five RF channels 540a-e that are spaced apart by 200 KHz. The RF channel of interest 540c is shown with a center frequency of 0 Hz. The two adjacent RF channels 540b, 540d have center frequencies that are +200 KHz and −200 KHz from the center frequency of the desired RF channel 540c. The next two nearest RF channels 540a, 540e (which are referred to as blockers or non-adjacent RF channels) have center frequencies that are +400 KHz and −400 KHz from the center frequency of the desired RF channel 540c. There may be other RF channels in the spectrum, which are not shown in FIG. 5 for simplicity. The non-desired channels 540a-b, 540d-e may carry adjacent channel interference (ACI) relative to the desired channel 540c. In GSM, an RF-modulated signal is generated with a symbol rate of $f_{sym}$=13000/40=270.8 kilo symbols/second (Ksps) and has a −3 dB bandwidth of up to +/−135 KHz. The RF-modulated signals on adjacent RF channels 540 may thus overlap one another at the edges, as shown in FIG. 5.

One or more modulation schemes may be used in GSM to communicate information such as voice, data, and/or control information. Examples of the modulation schemes may include GMSK (Gaussian Minimum Shift Keying), M-ary QAM (Quadrature Amplitude Modulation) or M-ary PSK (Phase Shift Keying), where M=$2^n$, with n being the number of bits encoded within a symbol period for a specified modulation scheme. GMSK is a constant envelope binary modulation scheme allowing raw transmission at a maximum rate of 270.83 kilobits per second (Kbps).

GSM is efficient for standard voice services. However, high-fidelity audio and data services desire higher data throughput rates due to increased demand on capacity to transfer both voice and data services. To increase capacity, the General Packet Radio Service (GPRS), EDGE (Enhanced Data rates for GSM Evolution) and UMTS (Universal Mobile Telecommunications System) standards have been adopted in GSM systems.

General Packet Radio Service (GPRS) is a non-voice service. It allows information to be sent and received across a mobile telephone network. It supplements Circuit Switched Data (CSD) and Short Message Service (SMS). GPRS employs the same modulation schemes as GSM. GPRS allows for an entire frame (all eight time slots) to be used by a single mobile station at the same time. Thus, higher data throughput rates are achievable.

EDGE uses both the GMSK modulation and 8-PSK modulation. The modulation type can be changed from burst to burst. 8-PSK modulation in EDGE is a linear, 8-level phase modulation with 3π/8 rotation, while GMSK is a non-linear, Gaussian-pulse-shaped frequency modulation. However, the specific GMSK modulation used in GSM can be approximated with a linear modulation (i.e., 2-level phase modulation with a π/2 rotation). The symbol pulse of the approximated GSMK and the symbol pulse of 8-PSK are identical.

In GSM/EDGE, frequency bursts (FB) are sent regularly by the base station (BS) 102 to allow mobile stations (MS) to synchronize their local oscillator (LO) to the base station 102 LO, using frequency offset estimation and correction. These bursts comprise a single tone, which corresponds to all "0" payload and training sequence. The all-zero payload of the frequency burst is a constant frequency signal, or a single tone burst. When in power mode, the remote terminal hunts continuously for a frequency burst from a list of carriers. Upon detecting a frequency burst, the MS will estimate the frequency offset relative to its nominal frequency, which is 67.7 KHz from the carrier. The MS LO will be corrected using this estimated frequency offset.

Figure 6:
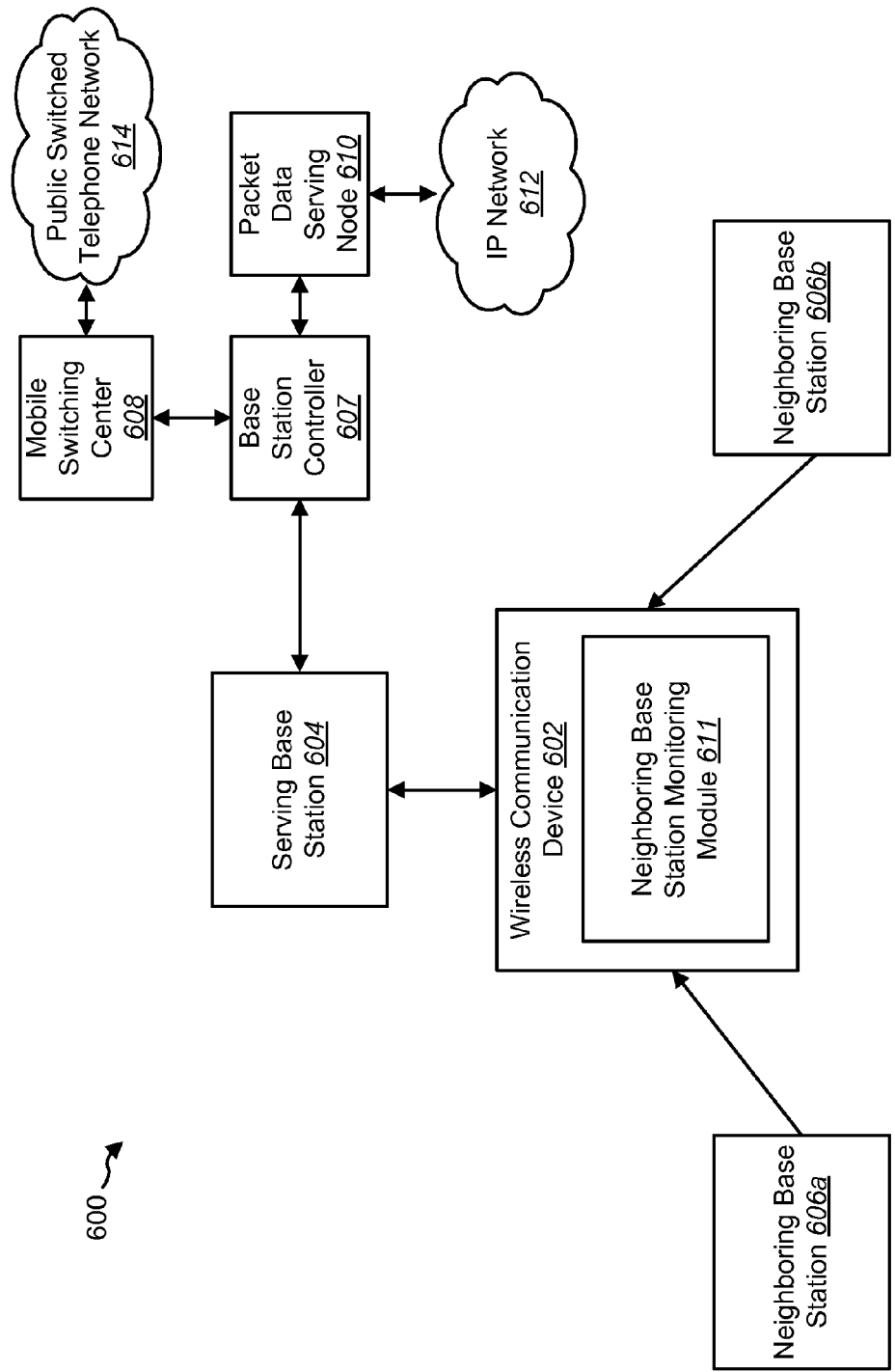
FIG. 6 is a block diagram illustrating a system for reducing idle mode power consumption.

FIG. 6 is a block diagram illustrating a system 600 for reducing idle mode power consumption. The system 600 may include a wireless communication device 602 that communicates with a serving base station 604 and one or more of the above discussed components. The serving base station 604 may communicate with a base station controller (BSC) 607 (also referred to as a radio network controller or packet control function). The base station controller 607 may communicate with a mobile switching center (MSC) 608, a packet data serving node (PDSN) 610 or internetworking function (IWF), a public switched telephone network (PSTN) 614 (typically a telephone company) and an Internet Protocol (IP) network 612 (typically the Internet). The mobile switching center (MSC) 608 may be responsible for managing communication between the wireless communication device 602 and the public switched telephone network 614. The packet data serving node 610 may be responsible for routing packets between the wireless communication device 602 and the IP network 612.

The wireless communication device 602 may also monitor the power (e.g., signal strength) of one or more neighboring base stations 606a-b. This may include using a neighboring base station monitoring module 611. A neighboring base station's 606a-b signal strength may be determined by monitoring a beacon channel, e.g., the Broadcast Control Channel (BCCH). The wireless communication device 602 may include a neighboring base station monitoring module 611. The neighboring base station monitoring module 611 may reduce the frequency of power monitoring for neighboring base stations 606a-b based on the signal strengths of neighboring base stations 606a-b. For example, when the neighboring base stations' 606a-b signal strengths are weak (e.g., as compared to a power threshold), the wireless communication device 602 may reduce the frequency with which it monitors that neighboring base stations' 606a-b signal strengths. Frequency reduction can reduce power consumption in the wireless communication device 602.

Utilized power thresholds can have varying aspects. For example, a utilized power threshold may be a value below which a neighboring base station 606a-b ceases to be a candidate for reselection, i.e., a neighboring base station 606a-b with a signal strength below the power threshold is not likely to become the serving base station 604. In some embodiments, utilized thresholds can be a static threshold and set at a static level of, for example, approximately −107 dBm. Other static threshold levels can also be used. Threshold levels can also be dynamic in certain instances. For example, a threshold can be dynamic based on chances of acquiring one or more neighbors at low powers. In areas where strong interference is present, increasing a utilized threshold in a dynamic fashion may be desired. In addition, in some embodiments use of alternating static and dynamic thresholds may be utilized as desired.

The wireless communication device 602 may maintain a timer on all the neighboring base stations 606a-b when it enters idle mode. If a neighboring base station's 606a-b signal strength is consistently below the power threshold for a certain period, the neighboring base station 606a-b may be assigned a low-frequency monitoring mode. If a neighboring base station 606a-b assigned to a low-frequency monitoring mode exhibits a higher-than-threshold power at any time, it may be re-assigned to the normal high-frequency monitoring mode. At such a time, the neighboring base station 606a-b may again become a candidate for the low-frequency monitoring mode. The frequency of monitoring in the low-frequency monitoring mode and high-frequency monitoring mode may comply with the 3$^{rd}$ Generation Partnership Project (3GPP) specifications and may be determined based on achieving a desirable balance between reducing the power consumption and maintaining the key performance indicators in the field.

In one configuration, the wireless communication device 602 may have a minimum number of power monitors per paging cycle and a maximum number of power monitors per paging cycle, e.g., based on 3GPP specifications. Based on the modes (high-frequency monitoring mode or low-frequency monitoring mode) of the neighboring base stations 606a-b, the wireless communication device 602 may perform a number of monitors that is between the minimum and the maximum. For example, the minimum number of monitors per paging cycle may be 1.5, i.e., one power monitor during a first paging cycle, two power monitors during a second paging cycle, one during a third paging cycle, two power monitors during a fourth paging cycle, etc. A maximum number of power monitors per paging cycle may be seven. If all neighboring base stations 606a-b were in high-frequency mode, the wireless communication device 602 may perform seven power monitors per paging cycle. Alternatively, if all the neighboring base stations 606a-b were in low-frequency mode, the wireless communication device 602 may perform 1.5 power monitors per paging cycle. Alternatively, if some of the neighboring base stations 606a-b were in low-frequency mode while some of the neighboring base stations 606a-b were in high-frequency mode, the wireless communication device 602 may perform somewhere between 1.5 and 7 power monitors per paging cycle.

Figure 7:
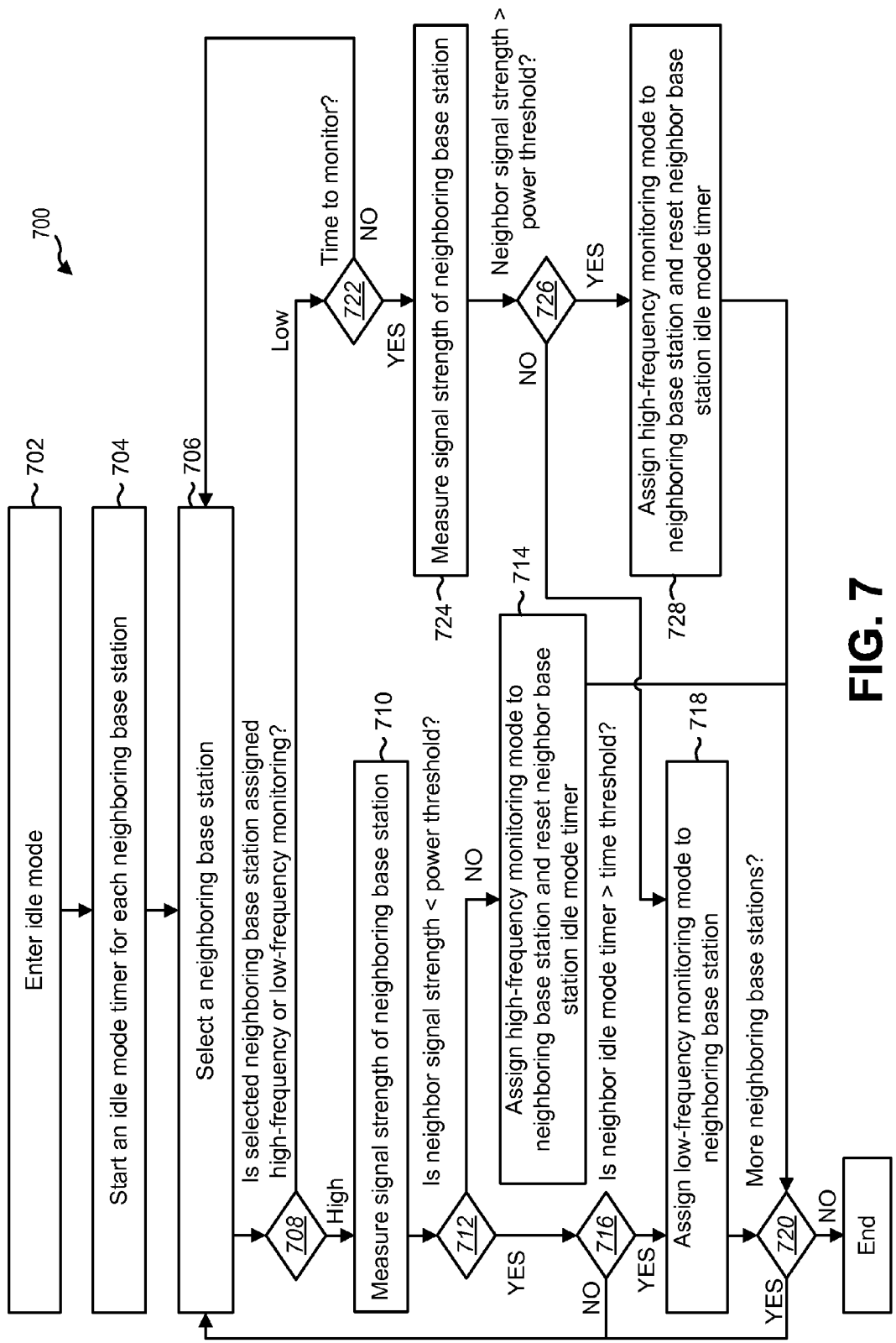
FIG. 7 is a flow diagram illustrating a method for reducing idle mode power consumption.

FIG. 7 is a flow diagram illustrating a method 700 for reducing idle mode power consumption. The method 700 may be performed by the wireless communication device 602 illustrated in FIG. 6. The wireless communication device 602 may enter 702 idle mode. In idle mode, the wireless communication device 602 may monitor the signal strength of neighboring base stations 606a-b. This monitoring may consume power resources from the battery. The method 700 may reduce idle mode power consumption by selectively reducing the frequency with which some neighboring base stations 606a-b are monitored.

Upon entering idle mode, the wireless communication device 602 may start 704 an idle mode timer for each neighboring base station. The idle mode timers may keep track of how long a particular neighboring base station's signal strength is below a power threshold. The wireless communication device 602 may select 706 a neighboring base station 606a-b and determine 708 if the selected neighboring base station is assigned high-frequency or low-frequency monitoring. If the selected neighboring base station 606a-b is assigned a high-frequency monitoring mode, the wireless communication device 602 may measure 710 the signal strength of the selected neighboring base station 606a-b. The wireless communication device 602 may also determine 712 if the signal strength of the neighboring base station 606a-b is less than a power threshold. The power threshold may be any suitable value, e.g., 110 dB. If the signal strength of the neighboring base station 606a-b is not less than a power threshold, the wireless communication device 602 may assign 714 a high-frequency monitoring mode to the selected neighboring base station 606a-b and reset the neighboring base station's idle mode timer. On the other hand, if the signal strength of the neighboring base station 606a-b is less than the power threshold, the wireless communication device 602 may determine 716 if the selected neighboring base station's idle mode timer is greater than a time threshold. If not, the wireless communication device 602 may select 706 a new neighboring base station 606a-b. If yes, the wireless communication device 602 may assign 718 a low-frequency monitoring mode to the neighboring base station 606a-b. The time threshold may be any suitable value, e.g., 30 seconds. Once the monitoring mode has been assigned, the wireless communication device 602 may determine 720 if there are more neighboring base stations 606a-b, and select 706 a new neighboring base station 606a-b if applicable.

If a selected neighboring base station 606a-b is assigned a low-frequency monitoring mode, the wireless communication device 602 may determine 722 if it is time to monitor the signal strength of the selected neighboring base station 606a-b. If not, the wireless communication device 602 may select 706 a new neighboring base station 606a-b. If yes, the wireless communication device 602 may measure 724 the signal strength of the selected neighboring base station 606a-b. Alternatively, the determination of whether it is time to monitor may not be performed. The wireless communication device 602 may also determine 726 whether the signal strength of the neighboring base station 606a-b is greater than the power threshold. If not, the wireless communication device 602 may assign 714 the low-frequency monitoring mode to the neighboring base station 606a-b. If, however, the signal strength of the selected neighboring base station 606a-b is greater than the power threshold, the wireless communication device 602 may assign 728 the high-frequency monitoring mode to the selected neighboring base station 606a-b and reset the neighboring base station's idle mode timer. The wireless communication device 602 may also determine 720 if there are more neighboring base stations 606*a-b*.

The wireless communication device 602 may maintain a timer and assign a monitoring mode for each individual neighboring base station 606*a-b*. When the signal strength for a particular neighboring base station 606*a-b* falls below the power threshold for longer than the timer threshold, it is assigned to a low-monitoring mode. The neighboring base station 606*a-b* may then be re-assigned to the high-monitoring mode when the signal strength again exceeds the power threshold. Therefore, in one configuration, the frequency of monitoring is handled on an individual neighboring base station 606*a-b* basis. For example, the frequency that a wireless communication device 602 monitors a first neighboring base station 606*a-b* is unaffected by a second neighboring base station 606*a-b* entering a low-monitoring mode, i.e., the monitoring mode for an individual neighboring base station 606*a-b* is independent of monitoring modes for others.

Alternatively, the signal strengths of all neighboring base stations 606*a-b* may be used together to determine the number of power monitors performed per paging cycle. For example, the wireless communication device 602 may reduce the number of power monitors performed per paging cycle only if the signal strength of all neighboring base stations 606*a-b* is below a threshold power for a threshold time. The wireless communication device 602 may then increase the number of power monitors performed during each paging cycle when the signal strength of any single neighboring base station 606*a-b* rises above the power threshold. In this configuration, the signal strength of a first neighboring base station may affect the frequency with which a second neighboring base station 606*a-b* is monitored.

For example, in one configuration, a paging cycle may be 2 seconds long, as determined by a serving base station 604. In this configuration, the wireless communication device 602 may have 15 neighbors. If, based on the number of high-frequency monitoring mode and low-frequency monitoring mode neighboring base stations, the wireless communication device 602 performs 1.5 power monitors per paging cycle, it may take 10 paging cycles (20 seconds) for all neighboring base stations to be monitored. In other words, the wireless communication device 602 may alternate between performing one power monitor in a paging cycle and 2 power monitors in a paging cycle. This may be a configuration with relatively weak neighboring base station signals. On the other hand, if neighboring base stations had relatively strong signal strengths, the wireless communication device 602 may perform 7 power monitors per paging cycle.

Figure 8:
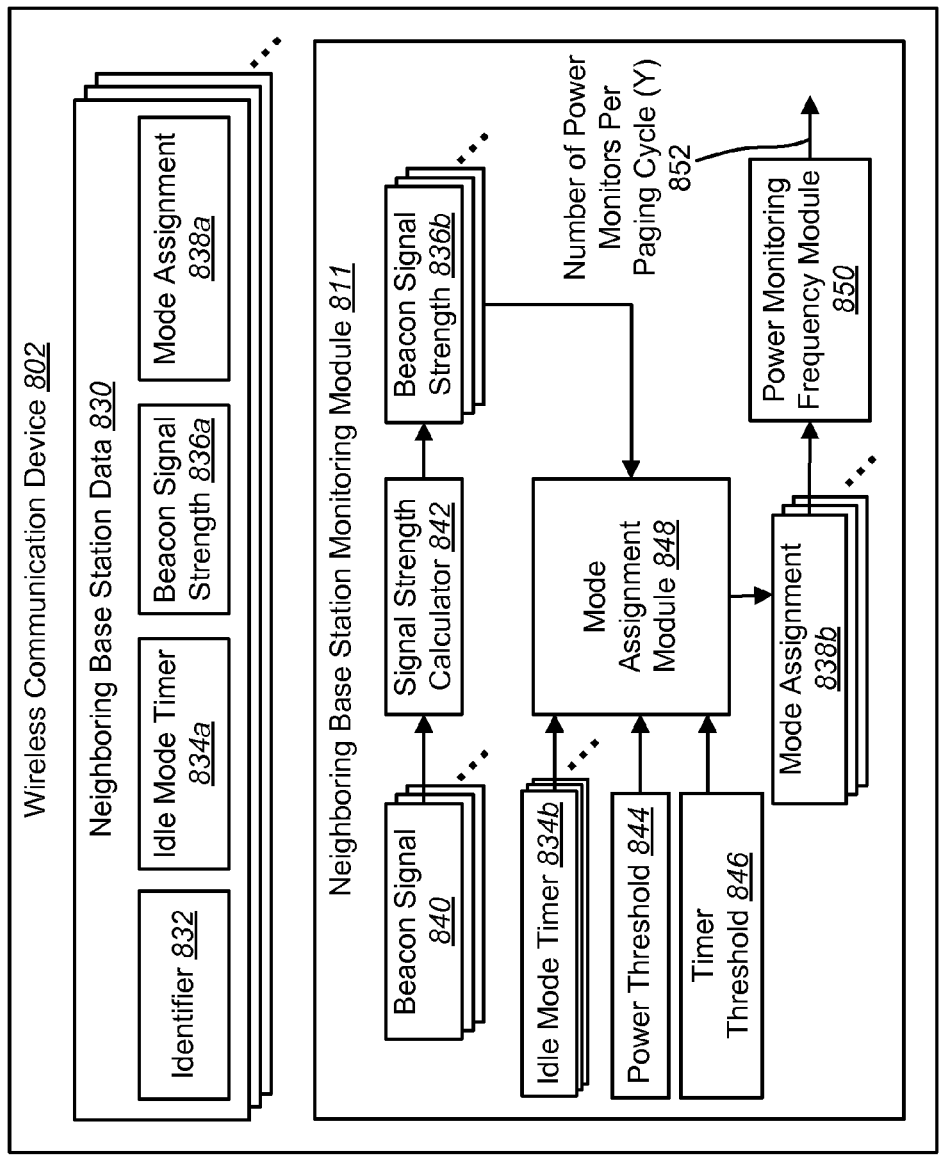
FIG. 8 is a block diagram illustrating a wireless communication device.

FIG. 8 is a block diagram illustrating a wireless communication device 802. The wireless communication device 802 may include neighboring base station data 830 and a neighboring base station monitoring module 811. This data 830 may include an identifier 832, an idle mode timer 834*a*, a beacon signal strength 836*a*, and a mode assignment 838*a* for each neighboring base station 606*a-b*. The identifier 832 may be a code that uniquely identifies each neighboring base station 606*a-b* in the wireless communication system. In one configuration, a Base Station Identity Code (BSIC) sent on a beacon channel, such as the Broadcast Control Channel (BCCH), may be used as the identifier 832. The wireless communication device 802 may determine a beacon signal strength 836*a* from the beacon channel and associate it with a particular neighboring base station 606*a-b* using the identifier 832. The idle mode timer 834*a* may be an incrementing timer maintained by the wireless communication device 802 for each neighboring base station 606*a-b*. The mode assignment 838*a* may be a determination that a particular neighboring base station 606*a-b* should be in a high-frequency monitoring mode or a low-frequency monitoring mode.

The neighboring base station monitoring module 811 may determine the mode assignments 838*a-b* and the number of power monitors per paging cycle (Y) 852 based on neighboring base station data 830. Specifically, a signal strength calculator 842 may determine beacon signal strengths 836*b* for neighboring base stations 606*a-b* from the beacon signals 840, e.g., the signals transmitted on a beacon channel such as the Broadcast Control Channel (BCCH). Along with the idle mode timers 834*b* for each neighboring base station 606*a-b*, a power threshold 844 and a timer threshold 846, a mode assignment module 848 may use the beacon signal strength 836*b* to determine the mode assignment for each selected neighboring base station 606*a-b*. Specifically, the mode assignment module 848 may assign all neighboring base stations 606*a-b* with a sufficient beacon signal strength 836*b* to a high-frequency monitoring mode, i.e., all neighboring base stations 606*a-b* with a beacon signal strength 836*b* higher than the power threshold 844 or lower than the power threshold 844 for less than the timer threshold 846. The mode assignment module 848 may assign all neighboring base stations 606*a-b* with a consistently low beacon signal strength 836*b* to a low-frequency monitoring mode, i.e., all neighboring base stations 606*a-b* with beacon signal strengths 836*b* that have been lower than the power threshold 844 for longer than the timer threshold 846. The power threshold 844 and timer threshold 846 may be selected to achieve a power reduction in idle mode and maintain performance indicators during operation. A power monitoring frequency module 850 may determine the number of power monitors to perform per paging cycle (Y) 852 (e.g., between 1.5 and 7) based on the mode assignments 838*b*.

Figure 9A:
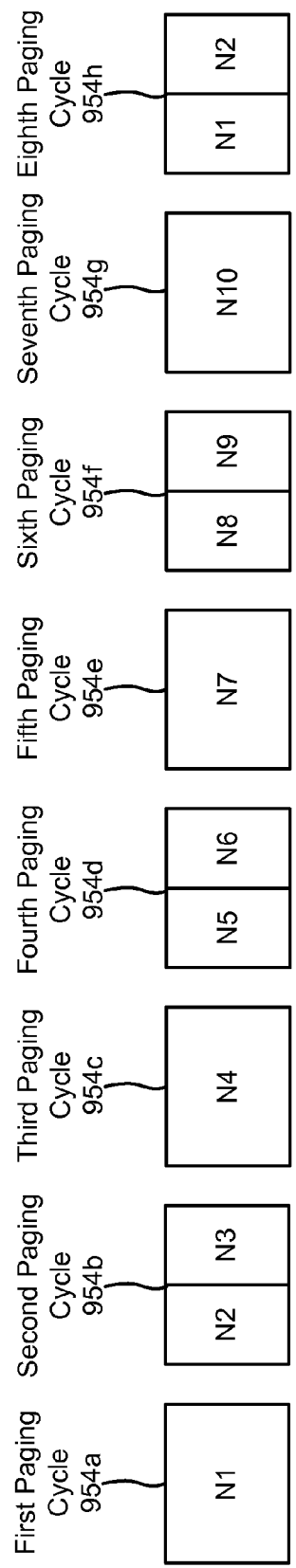
FIG. 9A is a block diagram illustrating power monitors during consecutive paging cycles in a configuration with low-power neighboring base stations.

FIG. 9A is a block diagram illustrating power monitors during consecutive paging cycles 954*a-h* in a configuration with low-power neighboring base stations 606*a-b*. More specifically, FIG. 9A illustrates power monitors performed during consecutive paging cycles by a wireless communication device 602 with all neighboring base stations 606*a-b* in low-frequency monitoring mode. For example, this may occur when the beacon signal strengths 836*a-b* of all neighboring base stations 606*a-b* are below a power threshold 844 for longer than a timer threshold 846, e.g., in an underground parking garage. In FIG. 9A, "N1" indicates a power monitor performed for the first neighboring base station 606*a-b*, "N2" indicates a power monitor performed for the second neighboring base station 606*a-b*, etc. Therefore, FIG. 9A is illustrated for a wireless communication device 602 having 10 neighboring base stations 606*a-b*, although the present systems and methods may be used for any number of neighboring base stations 606*a-b*.

In this configuration, the wireless communication device 602 may perform the minimum number of allowed power monitors every paging cycle 954*a-h*, shown as 1.5 power monitors per paging cycle. In other words, the number of power monitors per paging cycle (Y) 852 equals the minimum number of allowed power monitors, e.g., as defined in the 3GPP specification. The wireless communication device 802 may perform a power monitor for the first neighboring base station 606*a-b* (N1) during a first paging cycle 954*a*, a power monitor for the second neighboring base station 606*a-b* (N2) and the third neighboring base station 606*a-b* (N3) during a second paging cycle 954*b*, etc. Therefore, in this configuration with low-power neighboring base stations 606*a-b*, all neighboring base stations 606*a-b* may be monitored at least every seven paging cycles 954*a-h*. In one example, a GSM paging cycle 954a-h may range from about 470 milliseconds (2 multiframes×51 frames per multiframe× 4.6 milliseconds per frame) to 2.1 seconds (9 multiframes×51 frames per multiframe×4.6 milliseconds per frame). Therefore, in a ten-neighbor configuration that performs 1.5 power monitors per paging cycle 954a-h, each neighboring base station 606a-b may be monitored about every 3.2 seconds (470 milliseconds per paging cycle×6.75 paging cycles, on average, to monitor all ten neighbors) to 14.2 seconds (2.1 seconds per paging cycle×6.75 paging cycles, on average, to monitor all ten neighbors), depending on the duration of the paging cycles 954a-h. This reduction in power monitors performed may result in reduced current consumption in a wireless communication device 602. It may also reduce the "awake" time in a wireless communication device 602, thus allowing select components to remain in a sleep mode and save even more power.

Figure 9B:
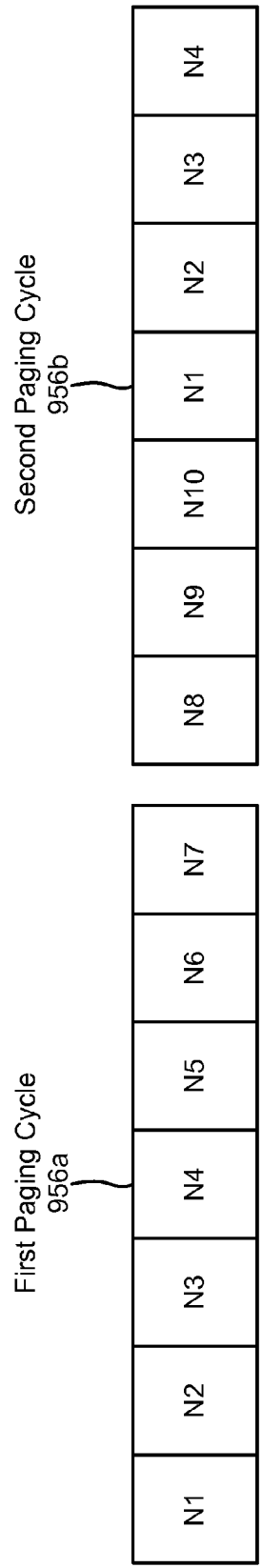
FIG. 9B is a block diagram illustrating power monitors during consecutive paging cycles in a configuration with high-power neighboring base stations.

FIG. 9B is a block diagram illustrating power monitors during consecutive paging cycles 956a-b in a configuration with all high-power neighboring base station 606a-b. More specifically, FIG. 9B illustrates power monitors performed during consecutive paging cycles by a wireless communication device 602 with all neighboring base stations 606a-b in high-frequency monitoring mode. For example, this may occur when the beacon signal strengths 836a-b of all neighboring base stations 606a-b are above a power threshold 844 or below the power threshold 844 for less than a timer threshold 846. As in FIG. 9A, "N1" indicates a power monitor performed for the first neighboring base station 606a-b, "N2" indicates a power monitor performed for the second neighboring base station 606a-b, etc. Specifically, FIG. 9B illustrates power monitors performed during consecutive paging cycles by a wireless communication device 602 with ten neighboring base stations 606a-b, all ten of which are in high-frequency monitoring mode.

In this configuration, the wireless communication device 602 may perform the maximum number of allowed power monitors every paging cycle 956a-b, shown as 7 power monitors per paging cycle 956a-b. In other words, the number of power monitors per paging cycle (Y) 852 equals the maximum number of allowed power monitors, e.g., as defined in section 6.6.1 in 3GPP TS 45.008. As used herein, the "maximum" number of allowed monitors refers to the highest number of power monitors required by the relevant specification for a paging cycle, i.e., to comply with a worst case configuration. There may not be an upper limit restriction for the number of power monitors allowed per paging cycle (i.e., if power consumption is not a concern, the wireless communication device 602 may exceed the "maximum" number), but the "maximum" number used herein refers to the most power monitors that may ever be required of the wireless communication device 602. In other words, if a wireless communication device 602 performs the maximum number of monitors (illustrated as 7 monitors per paging cycle 956a-b in FIG. 9B), the wireless communication device 602 will comply with even the most rigorous requirement in the specification, i.e., the maximum number of monitors will comply with the worst case scenario (defined in the relevant specification) for number of neighbors and paging cycle 956a-b length.

In the ten-neighbor configuration illustrated in FIG. 9B, The wireless communication device 802 may perform a power monitor for the first through seventh neighboring base stations 606a-b (N1-N7) during a first paging cycle 956a and a power monitor for the eighth through tenth neighboring base station 606a-b (N8-N10) before starting over again, i.e., power monitors for the first through fourth neighboring base stations 606a-b (N1-N4) may be performed in the second paging cycle 956b following the power monitors for the eighth through tenth neighboring base stations 606a-b (N8-N10). Therefore, in this configuration with high-power neighboring base stations 606a-b, all neighboring base stations 606a-b may be monitored at least every two paging cycles 956a-b. In one example, a GSM paging cycle 956a-b may range from about 470 milliseconds to 2.1 seconds, as discussed above. Therefore, in a ten-neighbor configuration that performs 7 power monitors per paging cycle 956a-b, each neighboring base station 606a-b may be monitored about every 670 milliseconds (470 milliseconds per paging cycle× 1.43 paging cycles to monitor all ten neighbors) to 3 seconds (2.1 seconds per paging cycle×1.43 paging cycles to monitor all ten neighbors), depending on the duration of the paging cycles 956a-b.

While FIG. 9A illustrates a minimum monitoring mode and FIG. 9B illustrates a maximum monitoring mode, the present systems and methods may operate between the minimum and maximum. For example, the wireless communication device 602 may perform 5 power monitors per paging cycle. In a ten-neighbor configuration that performs 5 power monitors per paging cycle (not shown), each neighboring base station 606a-b may be monitored about every 940 milliseconds (470 milliseconds per paging cycle×2 paging cycles to monitor all ten neighbors) to 4.2 seconds (2.1 seconds per paging cycle×2 paging cycles to monitor all ten neighbors), depending on the duration of the paging cycles.

Figure 10:
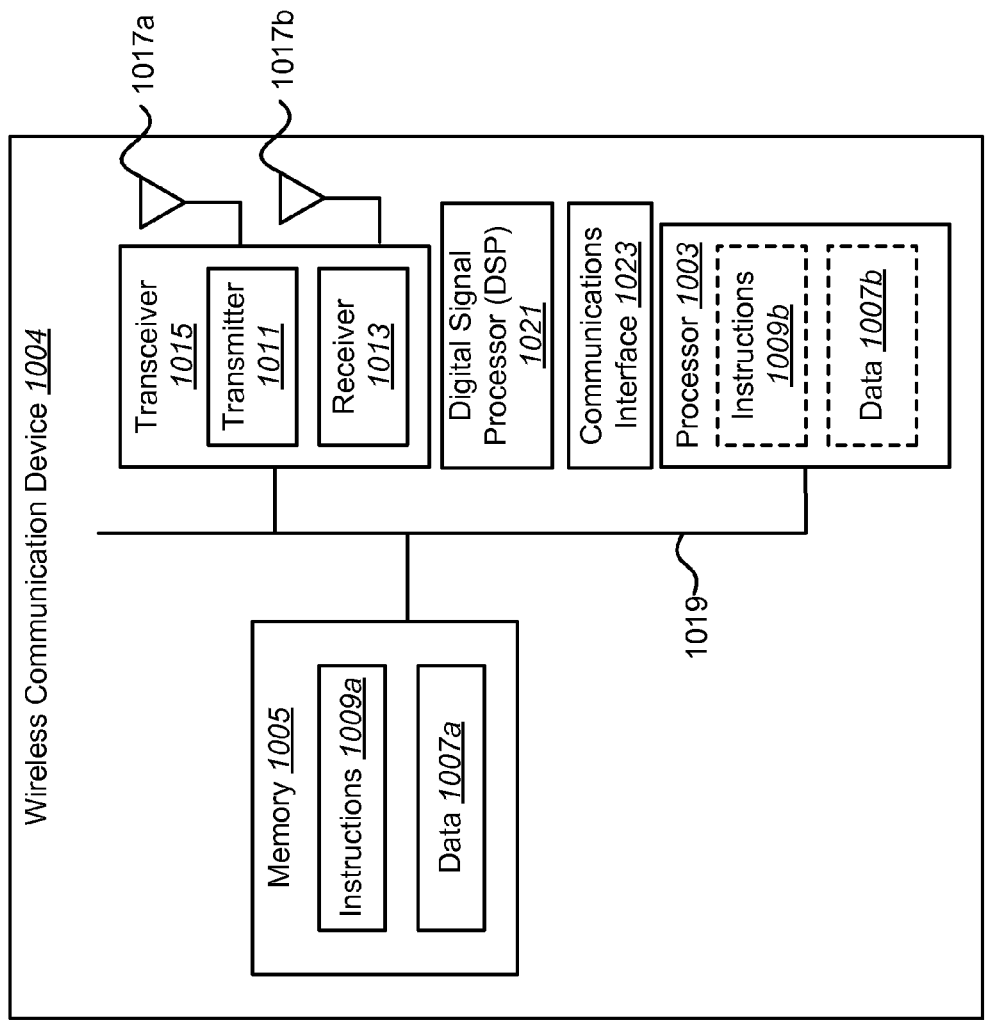
FIG. 10 illustrates certain components that may be included within a wireless communication device.

FIG. 10 illustrates certain components that may be included within a wireless communication device 1004. The wireless communication device 1004 may be an access terminal, a mobile station, a user equipment (UE), etc. For example, the wireless communication device 1004 may be the wireless communication device 802 illustrated in FIG. 8. The wireless communication device 1004 includes a processor 1003. The processor 1003 may be a general purpose single- or multi-chip microprocessor (e.g., an ARM), a special purpose microprocessor (e.g., a digital signal processor (DSP)), a microcontroller, a programmable gate array, etc. The processor 1003 may be referred to as a central processing unit (CPU). Although just a single processor 1003 is shown in the wireless communication device 1004 of FIG. 10, in an alternative configuration, a combination of processors (e.g., an ARM and DSP) could be used.

The wireless communication device 1004 also includes memory 1005. The memory 1005 may be any electronic component capable of storing electronic information. The memory 1005 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1007a and instructions 1009a may be stored in the memory 1005. The instructions 1009a may be executable by the processor 1003 to implement the methods disclosed herein. Executing the instructions 1009a may involve the use of the data 1007a that is stored in the memory 1005. When the processor 1003 executes the instructions 1009a, various portions of the instructions 1009b may be loaded onto the processor 1003, and various pieces of data 1007b may be loaded onto the processor 1003.

The wireless communication device 1004 may also include a transmitter 1011 and a receiver 1013 to allow transmission and reception of signals to and from the wireless communication device 1004. The transmitter 1011 and receiver 1013 may be collectively referred to as a transceiver 1015. Multiple antennas 1017a-b may be electrically coupled to the transceiver 1015. The wireless communication device 1004 may also include (not shown) multiple transmitters, multiple receivers, multiple transceivers and/or additional antennas.

The wireless communication device 1004 may include a digital signal processor (DSP) 1021. The wireless communication device 1004 may also include a communications interface 1023. The communications interface 1023 may allow a user to interact with the wireless communication device 1004.

The various components of the wireless communication device 1004 may be coupled together by one or more buses, which may include a power bus, a control signal bus, a status signal bus, a data bus, etc. For the sake of clarity, the various buses are illustrated in FIG. 10 as a bus system 1019.

The term "coupled" encompasses a wide variety of connections. For example, the term "coupled" should be interpreted broadly to encompass circuit elements directly connected to each other and circuit elements indirectly connected via other circuit elements.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods and apparatus described herein without departing from the scope of the claims.

We claim:

1. A method for reducing idle mode power consumption by a mobile device, comprising:
   entering an idle mode, wherein the mobile device is not communicating and yet continues monitoring wireless signals from one or more other wireless communication devices while in the idle mode;
   measuring, when a selected neighboring base station is assigned a high-frequency monitoring mode, a signal strength of the selected neighboring base station, wherein more than a minimum number of power monitors per paging cycle are performed when at least one neighboring base station is in the high-frequency monitoring mode;
   assigning, by the mobile device while in the idle mode, a low-frequency monitoring mode to the selected neighboring base station upon determining the signal strength of the selected neighboring base station has been below a power threshold for longer than a time threshold;
   measuring, when the selected neighboring base station is assigned the low-frequency monitoring mode, the signal strength of the selected neighboring base station when it is time to measure the signal strength, wherein the minimum number of power monitors per paging cycle are performed when all neighboring base stations are in the low-frequency monitoring mode; and assigning the selected neighboring base station to the high-frequency monitoring mode when the signal strength of the selected neighboring base station is above the power threshold.

2. The method of claim 1, further comprising maintaining an idle mode timer for each neighboring base station.

3. The method of claim 2, wherein the assigning the low-frequency monitoring mode comprises comparing the idle mode timer for the selected neighboring base station with the time threshold.

4. The method of claim 2, wherein the assigning the high-frequency monitoring mode comprises resetting the idle mode timer for the selected neighboring base station if the selected neighboring base station is above the power threshold.

5. The method of claim 1, wherein the power threshold and the time threshold are selected to achieve a power reduction in the idle mode and maintain performance indicators during operation.

6. The method of claim 1, wherein the method is performed in a Global System for Mobile Communications (GSM) system.

7. The method of claim 1, wherein the time threshold is static.

8. The method of claim 1, further comprising:
assigning the low-frequency monitoring mode to each of a plurality of neighboring base station if the signal strength of the selected neighboring base station has been below the power threshold for longer than the time threshold.

9. The method of claim 1, wherein entering the idle mode further comprises:
determining the mobile device is not transmitting; and
entering an awake mode associated with a paging schedule during which the mobile device may monitor, according to the assigned low-frequency monitoring mode or the assigned high-frequency monitoring mode, the signal strength of the neighboring base station, wherein the assigned low-frequency monitoring mode or the assigned high-frequency monitoring mode reduces a duration in which the mobile device is in the awake mode.

10. A wireless communication device for reducing idle mode power consumption, comprising:
a processor;
memory in electronic communication with the processor;
instructions stored in the memory, the instructions being executable by the processor to enter an idle mode, wherein the wireless communication device is not communicating and yet continues monitoring wireless signals from one or more other wireless communication devices while in the idle mode;
select, while in the idle mode, a neighboring base station;
measure, when the selected neighboring base station is assigned a high-frequency monitoring mode, a signal strength of the neighboring base station, wherein more than a minimum number of power monitors per paging cycle are performed when at least one neighboring base stations is in the high-frequency monitoring mode;
assign, by the wireless communication device while in the idle mode, a low-frequency monitoring mode to the selected neighboring base station upon determining the signal strength of the selected neighboring base station has been below a power threshold for longer than a time threshold;
measure, when the selected neighboring base station is assigned the low-frequency monitoring mode, the signal strength of the neighboring base station when it is time to measure the signal strength, wherein the minimum number of power monitors per paging cycle are performed when all neighboring base stations are in the low-frequency monitoring mode; and
assign the high-frequency monitoring mode to the selected neighboring base station when the signal strength of the selected neighboring base station is above the power threshold.

11. The wireless communication device of claim 10, further comprising instructions executable to maintain an idle mode timer for each neighboring base station.

12. The wireless communication device of claim 11, wherein the instructions executable to assign the low-frequency monitoring mode comprise instructions executable to compare the idle mode timer for the selected neighboring base station with the time threshold.

13. The wireless communication device of claim 12, wherein the instructions executable to assign the high-frequency monitoring mode comprise instructions executable to reset the idle mode timer for the selected neighboring base station if the selected neighboring base station is above the power threshold.

14. The wireless communication device of claim 10, wherein the power threshold and the time threshold are selected to achieve a power reduction in the idle mode and maintain performance indicators during operation.

15. The wireless communication device of claim 10, wherein the wireless communication device operates in a Global System for Mobile Communications (GSM) system.

16. A wireless communication device for reducing idle mode power consumption, comprising:
means for entering an idle mode, wherein the wireless communication device is not communicating and yet continues monitoring wireless signals from one or more other wireless communication devices while in the idle mode;
means for selecting, while in the idle mode, a neighboring base station;
means for measuring, when the selected neighboring base station is assigned a high-frequency monitoring mode, a signal strength of the selected neighboring base station, wherein more than a minimum number of power monitors per paging cycle are performed when at least one neighboring base stations is in the high-frequency monitoring mode;
means for assigning, by the wireless communication device while in the idle mode, when the selected neighboring base station is assigned the high-frequency monitoring mode, a low-frequency monitoring mode to the selected neighboring base station upon determining the signal strength of the selected neighboring base station has been below a power threshold for longer than a time threshold;
means for measuring, when the selected neighboring base station is assigned the low-frequency monitoring mode, the signal strength of the selected neighboring base station when it is time to measure the signal strength, wherein the minimum number of power monitors per paging cycle are performed when all neighboring base stations are in the low-frequency monitoring mode; and
means for assigning the high-frequency monitoring mode to the selected neighboring base station when the signal strength of the selected neighboring base station is above the power threshold.

17. The wireless communication device of claim 16, further comprising means for maintaining an idle mode timer for each neighboring base station.

18. The wireless communication device of claim 17, wherein the means for assigning the low-frequency monitoring mode comprises means for comparing the idle mode timer for the selected neighboring base station with the time threshold.

19. The wireless communication device of claim 18, wherein the means for assigning the high-frequency monitoring mode comprises means for resetting the idle mode timer for the selected neighboring base station if the selected neighboring base station is above the power threshold.

20. In a wireless system that comprises a plurality of wireless communication devices configured to communicate with at least one other wireless communication device, a power saving wireless device configured for reducing idle mode power consumption, said power saving wireless device comprising:
 a receiver module configured to receive wireless communication signals from one or more of the plurality of wireless communication devices;
 a processor module, in electronic communication with said receiver module and operating in an idle mode, wherein the power saving wireless device is not communicating and yet continues monitoring wireless signals from one or more other wireless communication devices, the processor module configured to determine a signal strength, while in the idle mode, for each received wireless communication signal, said signal strength determination being based on comparison with a predetermined threshold;
 the processor module being further configured to assign a frequency state for one or more of the plurality of wireless communication devices based on each determined signal strength that corresponds to said one or more of the plurality of wireless communication devices;
 the processor module being further configured to adjust a frequency monitoring mode, while the processor module is in the idle mode, of said power saving wireless device for each of the one or more of a plurality of wireless communication devices in communication with wireless device, wherein a low frequency state is assigned to one or more of the plurality of wireless communication devices when a first corresponding signal strength is determined to be below the predetermined threshold for longer than a time threshold, wherein a high frequency state is assigned to one or more of the plurality of wireless communication devices when a second corresponding signal strength is above the predetermined threshold; and
 the processor module is configured to monitor received signal strengths of a minimum number of power monitors per paging cycle when the frequency state is in a low-frequency monitoring mode and to monitor received signal strengths of more than the minimum number of power monitors per paging cycle when the frequency state is in a high-frequency monitoring mode.

21. The power saving wireless device of claim 20, wherein the processor module is configured to maintain an idle mode timer for each of the one or more of the plurality of wireless communication devices in communication with the power saving wireless device.

22. The power saving wireless device of claim 20, wherein the frequency monitoring mode is at least partially based on the frequency state.

23. The power saving wireless device of claim 20, wherein the wireless system is configured as a Global System for Mobile Communications (GSM) system.

* * * * *